Nov. 24, 1970 M. McCULLOUGH 3,541,693
CUTTING IMPLEMENT
Filed Dec. 5, 1968 2 Sheets-Sheet 1
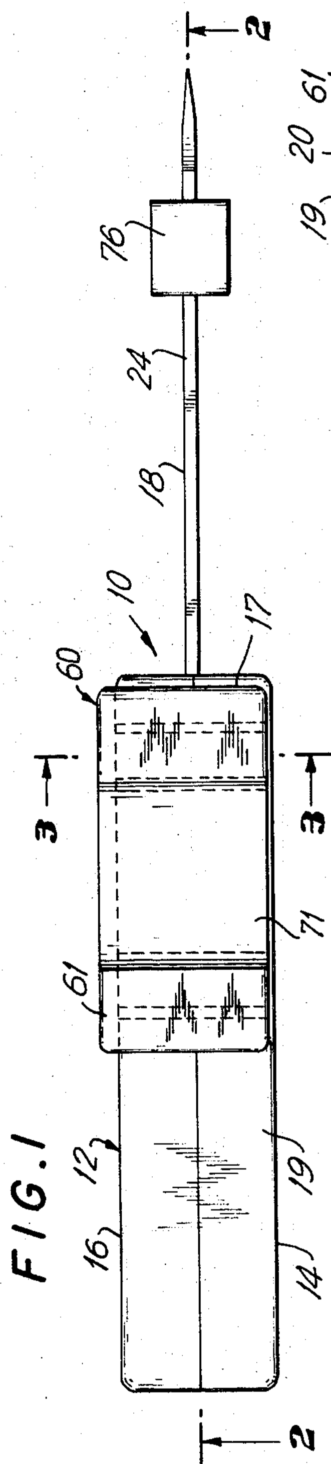
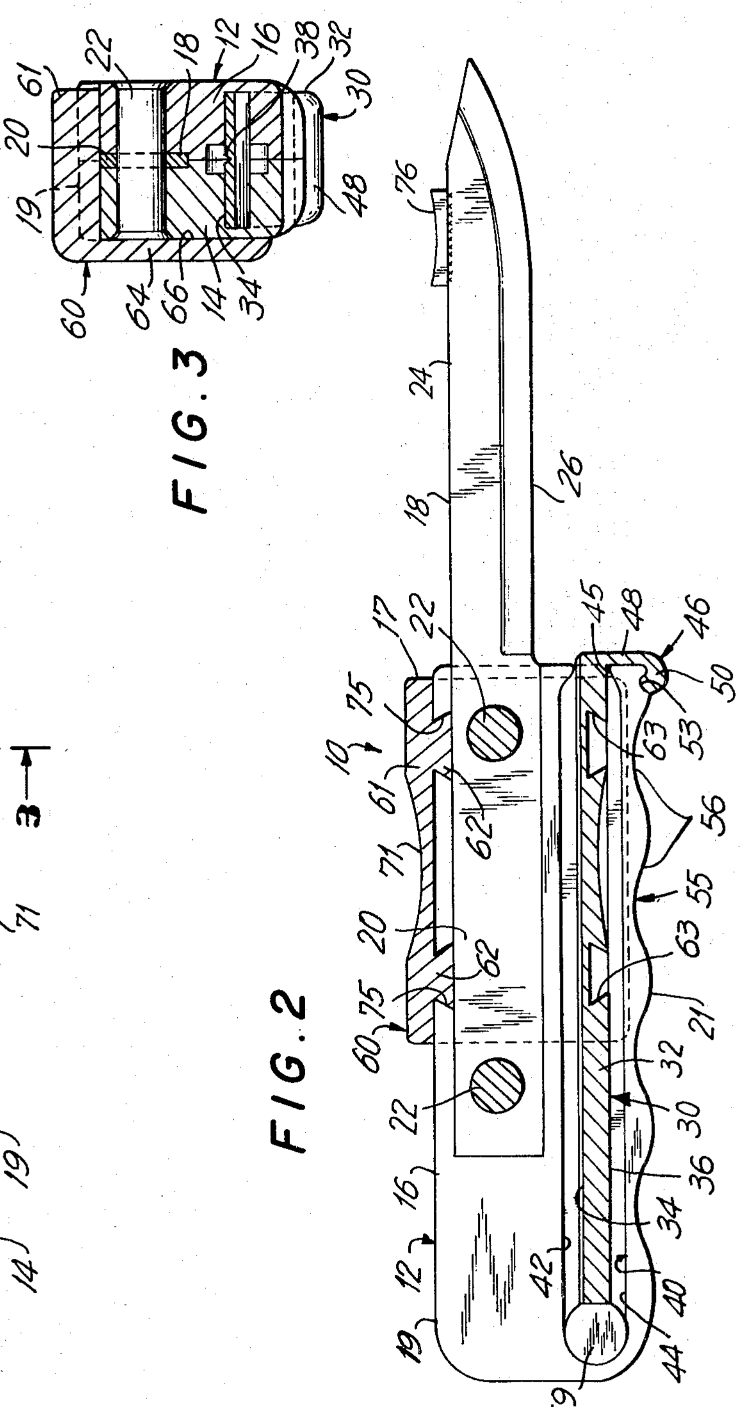
INVENTOR.
MARJORIE McCULLOUGH
BY
Leonard W. Suroff
ATTORNEY

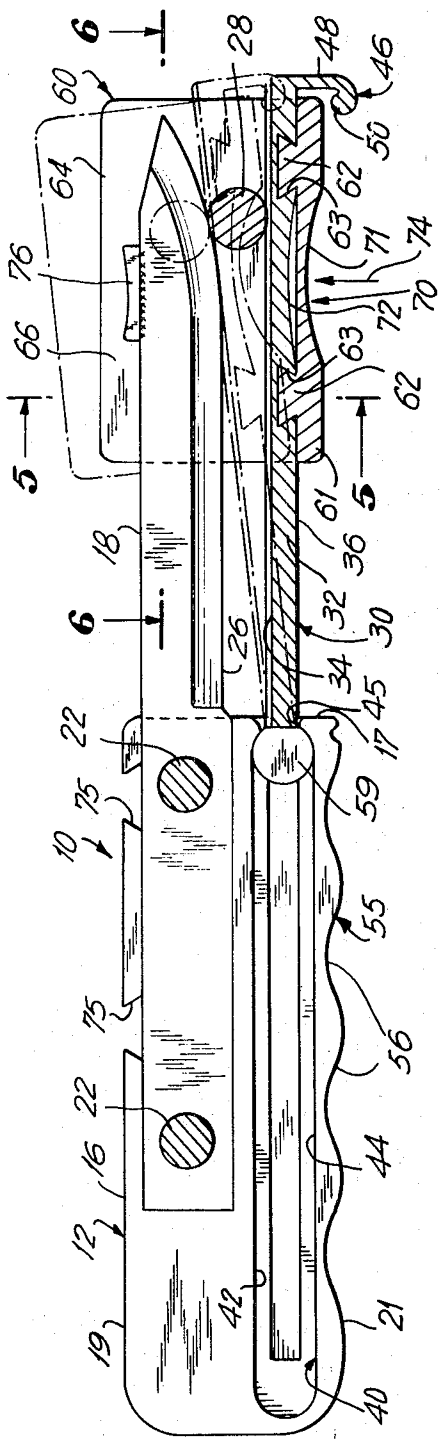
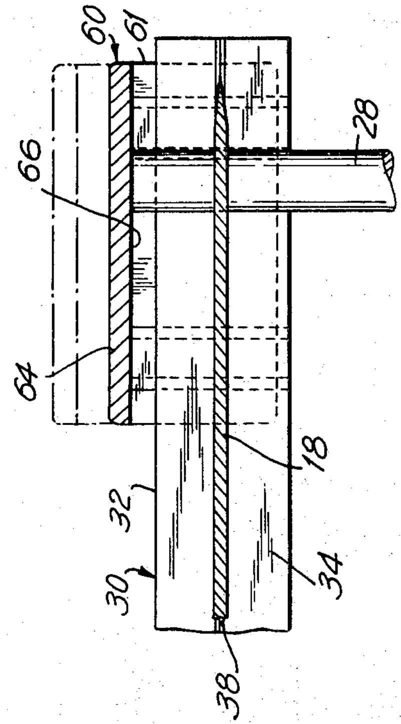
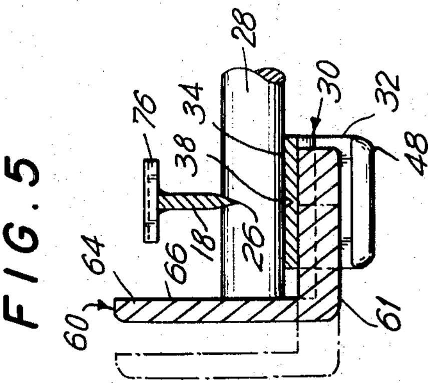
INVENTOR.
MARJORIE McCULLOUGH
BY
Leonard W. Suroff
ATTORNEY United States Patent Office 3,541,693

Patented Nov. 24, 1970

1

3,541,693

CUTTING IMPLEMENT

Marjorie McCullough, 258 Wadsworth Ave., New York, N.Y. 10033

Filed Dec. 5, 1968, Ser. No. 781,413
Int. Cl. B26b *3/03*
U.S. Cl. 30—136 15 Claims

ABSTRACT OF THE DISCLOSURE

The disclosure provides for a cutting implement including a blade with a cutting edge and pivotally mounted supporting means for retaining the object to be cut when in its extended position, with the cutting edge in overlapping relationship to the supporting means. Stopping means adjustably mounted relative to the supporting means is provided for controlling the length of object to be cut. The stopping means is removable from the supporting means and the latter may be placed in a retracted position in which it is contained within the handle means of the cutting implement and retained there in place.

BACKGROUND OF THE INVENTION

The invention relates generally to cutting implements and more particularly to a device for cutting objects, having a supporting cutting surface associated therewith to protect the user and means to adjust the length to which the objects are cut.

The cutting implement of the present invention permits the user to avoid seeking out a cutting surface on which to cut any number of objects of various shapes and sizes. In slicing vegetables, etc., with a regular knife the user cannot always judge the force required to cut the object and more often than not will cut into the cutting surface. If no cutting surface is available the user often uses his finger therefor which is often cut by the blade. In addition if repeated slices of a given thickness are required the user must rely on his eye to obtain consistent lengths. The present invention contains stopping means to permit controlled lengths to be cut from the object. The supporting means also has the advantage of being retractable so that it may be used as a regular knife.

OBJECTIVES OF THE INVENTION

An object of the present invention is to provide a cutting implement that has a supporting member associated therewith to receive the object to be cut thereon.

Another object of the present invention is to provide a cutting implement having a supporting member that may be extended or retracted into the handle to permit the cutting implement to be used as a regular knife.

Another object of the present invention is to provide a cutting implement having a stopping means associated with the supporting member to select the length of object to be cut.

Other objects of the present invention will become apparent as the disclosure proceeds.

SUMMARY OF THE INVENTION

This invention provides a cutting implement having handle means with a blade having a sharp cutting edge extending from on end thereof with supporting means pivotally connected to the handle means and extending below the cutting edge so that an object may be positioned on the cutting surface of the supporting means and the handle means gripped by the user and by pivoting the blade toward the supporting member, or visa versa, the object is cut. By providing the cutting surface the user need not seek out a surface on which to place the object which often results in the cutting of the surface as the

2 force cannot be instantaneously discontinued. In addition stopping means are provided and adjustably mounted relative to the supporting means for varying the lateral distance to the cutting edge. This permits the slicing of the object in various lengths, such as for use in cutting vegetables in making a salad, etc., since the object is positioned on the supporting surface and abuts the stopping means which is held in a fixed position by retaining means. A scale is provided on the stopping means to indicate the length of cut object.

When the cutting implement is not in use the supporting means may be longitudinally moved by guiding means associated therewith from its extended position, to its retracted position which is within chamber means extending within the handle means. Locking means are provided to retain the supporting means in its retracted position within the handle means when not in use and gripping means are provided on the handle means to assist the user.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a top elevational view of the cutting element;

FIG. 2 is a sectional view along line 2—2 of FIG. 1;

FIG. 3 is a sectional view along line 3—3 of FIG. 1;

FIG. 4 is a sectional view similar to FIG. 2, showing the supporting means in its extended position;

FIG. 5 is a sectional view along line 5—5 of FIG. 4; and

FIG. 6 is a sectional view along line 6—6 of FIG. 5.

PREFERRED EMBODIMENT OF THE INVENTION

Referring to the drawings we have illustrated a cutting implement generally indicated by the reference numeral 10 which includes handle means 12, which may be made out of a plastic or metallic material, and is seen to include a left section 14 and right section 16 designed to accommodate a blade 18 such that the rear portion 20 extends within the handle means 12 and is fixedly secured thereto by two transverse pins 22 extending therethrough. The front portion 24 of the blade 18 includes a longitudinally extending cutting edge 26 and extends beyond the front edge 17 of the handle means 12. The top edge 19 and bottom edge 21 are of a width to permit easy grasp of the handle means 12 by the user. The cutting implement 10 which is used to slice or cut a variety of objects 28 is provided with supporting means 30 which is to be used during the cutting operation so as to avoid the necessity of using a cutting board and preventing an applied pressure between the cutting edge 26 and the object 28 being cut to injure the user. The supporting means 30 is connected to the handle means 12 below the cutting edge 26 and is adapted to be longitudinally adjusted between its retracted position illustrated in FIG. 2, and its extended position illustrated in FIG. 4. The supporting means 30 includes a support member 32 having a cutting surface 34 on one side thereof and a bottom surface 36 at the opposite side thereof and having a longitudinally extending groove or channel 38 along the cutting surface 34 which forms a seat for receiving the cutting edge 26 therein when the supporting means 30 has reached the position illustrated in phantom in FIG. 4.

To permit the relative adjustment of the supporting means 30 between its extended and retracted positions we have chamber means 40 longitudinally extending within the handle means 12 to contain the supporting means in its retracted position as seen in FIG. 2. The chamber 40 has an upper wall surface 42 and lower wall surface 44 which has an opening 45 at the front edge 17 of the handle means 12 which is narrower than the height as defined by the walls 42 and 44 for reasons hereafter explained.

To permit the relative adjustment of the supporting means 30 from its retracted to its extended positions guiding means 46 is provided such that the user may grip the guiding means 46 and pull out or extend the supporting means 30 from its position within the chamber means 40. The guiding means 46 includes a downwardly extending arm 48 from the supporting means 30 terminating in an ear 50 having a contoured surface at the bottom thereof. In order to maintain the supporting means 30 in its retracted position locking means 52 is provided on the handle means 12 and may be in the form of a detent 53 extending transversely across the bottom edge 21 of the handle means 12 for receiving the contoured ear portion 50 of the guiding means 46 in snap-in relationship as seen with respect to FIG. 2.

Such that the user can easily grip the cutting implement, gripping means 55 is provided on the bottom edge 21 of the handle means 12 and may include a series of depressions 56 adapted to receive the fingers of the user during the operation of the cutting implement as hereafter described.

Since the user of the cutting implement will be cutting objects 28 of various sizes, shapes, materials, and as illustrated if it is circular it may vary in diameter, it has been found desirable to provide pivot means 58 for pivotly securing the supporting means 30 to the handle means 12 so as to permit relative displacement of the cutting surface 34 relative to the cutting edge 26. The pivot means 58 includes a circular surface in the form of a knob 59 at one end of the support member 32 and as seen in FIG. 4, it is substantially equal to the width of the chamber means 40 as defined by walls 42 and 44 and is greater than the opening 45 at the front edge 17 of the handle means 12. The knob 59 also acts as a stop preventing the support member 32 from being removed from the chamber 40.

To assist the user in using the cutting implement 10 to obtain a predefined width of the object 28 when cut, stopping means 60 is provided and adjustably mounted relative to the supporting means 30 for varying the lateral distance to the cutting edge 26. The stopping means 60 as seen particularly in FIGS. 5 and 6, includes a base section 61 mounted in sliding relationship to the supporting means 30 as by a pair of tongues or fingers 62 adapted to slide in dovetail grooves 63 extending transversely in the support member 32. The base section 61 may be integrally formed with a rear section 64 and having a face surface 66 extending in a plane substantially parallel to the cutting edge 26. In this manner the length of the object 28 to be severed can be selected and maintained for any number of cuts as desired. As seen in FIG. 5, the front end of the object 28 to be cut engages the face surface 66 of the stopping means 60 and the supporting means 30 and blade 18 are brought together such that the desired length of object is cut.

In order to retain the stopping means 60 in a fixed position to assure successive cuts of the same length of the object 28 holding means 70 is provided for releasably connecting the stopping means 60 and the supporting means 30 in whatever extended position is desired. One form of holding means other than a threaded engagement, which might be utilized, is illustrated in particular in FIG. 4, and as seen the base section 61 of the stopping means 60 contains the well or depression 71 between the respective tongues 62 such that there is a thinning out of the base section. A complementary depression 72 is provided and extends transversely of the support member 32 in a manner that the well 71 is adapted to receive a finger of the user. The clearance between the respective tongues 62 and accommodating grooves 63 is minimal such that when the respective supporting means 30 and stopping means 60 are shown as illustrated in FIG. 4, in solid lines, relative movement may be had between the respective means with a minimal of free play. Except that the base section 61 is made of a material and of a thickness at the depressed area 71 that when a force is applied in the direction of arrow 74 a slight depression of the base section 61 into the accommodating recess 72 in the support member 32 causes a slight angular rotation of the tongues 62 which is sufficient to cause a frictional interference with the grooves 63 such that as long as a static force is applied in the direction of arrow 74 the stopping means 60 is maintained in a fixed position so that a number of cuts may be made of the object.

To provide sufficient versatility to the cutting implement 10 it is appreciated that there are instances in which the stopping means 60 is not required since the user is not particularly concerned with a discrete length of the object he is cutting, and for storage purposes since the supporting means may be retracted it has been found desirable that if the cutting implement is used without the supporting means 30 then the stopping means 60 may be removed from the position as seen in FIG. 4 and placed in its assembled position as seen in FIGS. 1 through 3. In this latter position the handle means 12 has accommodating recesses 75 extending transversely thereof such that the stopping means 60 may be assembled as seen in FIG. 3, to permit the use of the cutting implement as is illustrated. The well 71 then becomes usable for a thumb rest of the user in that position. It shall also be pointed out that if the stopping means 60 remains in the position as seen in FIGS. 1–3 the supporting means 30 might still be used except that the stopping means 60 is not provided and if this is desired then the depression 72 in the support member 32 may act as a rest for a finger of the user.

When the cutting implement is used as illustrated in FIG. 4, and when a sufficient pressure has to be applied it has been found desirable to use a finger rest 76 which may be welded to the upper edge of the blade 18 such that the respective fingers of the user may be simultaneously placed on the finger rest 76 and the depressions 71 and 72 depending upon how the versatile cutting implement 10 is used.

The handle means, supporting means, stopping means, may be made of a metallic or plastic material and the cutting blade is generally made of a metallic material.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

I claim:

1. A cutting implement, comprising:

(A) handle means, (B) a blade having a cutting edge secured to said handle means, (C) supporting means having a cutting surface connected to said handle means and adapted to be adjusted from a retracted position in which said supporting means extends within said handle means, to an extended position wherein said cutting surface is in overlapping relation to said cutting edge, and (D) means pivotally securing said supporting means to said handle means in its extended position so as to provide relative displacement of said supporting means relative to said cutting edge.

2. A cutting implement as defined in claim 1, and further including stopping means adjustably mounted relative to said supporting means for controlling the length of an object cut by said cutting edge.

3. A cutting implement as defined in claim 2, wherein said stopping means includes a base section adapted to be mounted in sliding relationship to said supporting means and a rear section connected to said base section and having a face extending in a plane substantially parallel to said cutting edge for engagement by the object to be cut.

4. A cutting implement as defined in claim 2, and further including scale means on said stopping means to indicate the distance between said face and said cutting edge.

5. A cutting implement as defined in claim 2, wherein said stopping means is removable from said supporting means and adapted to be secured to said handle means to act as a finger support.

6. A cutting implement as defined in claim 2, and further including retaining means for releasably interconnecting said adjustably mounted stopping means in selected positions relative to said cutting edge.

7. A cutting implement as defined in claim 6, wherein said retaining means includes a base section having a pair of tongues extending therefrom for sliding engagement with a pair of grooves in said supporting means and the portion of said base section extending between said tongues being resiliently deformable, so that deflection of said deformable portion will provide frictional engagement between said tongues and the walls of said grooves to provide said releasably interconnecting fixed engagement therebetween.

8. A cutting implement as defined in claim 1, wherein said supporting means includes a channel longitudinally extending along said cutting surface for receiving said cutting edge therein.

9. A cutting implement as defined in claim 1, wherein said handle means includes chamber means longitudinally extending therein to contain said support means in its retracted position.

10. A cutting implement as defined in claim 9, and further including locking means associated with said handle means and supporting means to retain the latter in a releasably fixed position in its retracted position.

11. A cutting implement as defined in claim 1, and further including gripping means on said handle means to permit a firm grip by the user.

12. A cutting implement as defined in claim 1, and further including guiding means extending from said supporting means for moving the latter between its retracted and extended positions.

13. A cutting implement, comprising:

(A) handle means, (B) a blade secured to said handle means with a cutting edge extending along one edge thereof, (C) supporting means having a cutting surface connected to said handle means and adapted to be adjusted from a retracted position in which said supporting means extends within said handle means, to an extended position wherein said cutting surface is in overlapping relation to said cutting edge, (D) means pivotally securing said supporting means to said handle means in its extended position so as to provide relative displacement of said supporting means relative to said cutting edge, (E) stopping means adjustably mounted relative to said supporting means for controlling the length of an object cut by said cutting edge, (F) guiding means extending from said supporting means for moving the latter between its retracted and extended positions, and (G) said handle means including chamber means longitudinally extending therein to contain said supporting means in its retracted position.

14. A cutting implement as defined in claim 13, (a) further including locking means associated with said handle means and supporting means to retain the latter in a releasably fixed position in its retracted position, and (b) wherein said stopping means includes a base section adapted to be mounted in sliding relationship to said supporting means and a rear section connected to said base section and having a face extending in a plane substantially parallel to said cutting edge for engagement by the object to be cut.

15. A cutting implement as defined in claim 13, wherein said stopping means is removable from said supporting means and adapted to be secured to said handle means to act as a finger support.

References Cited

UNITED STATES PATENTS

| | | | |
|---|---|---|---|
| 1,756,750 | 4/1930 | Igou | 30—179 |
| 1,795,394 | 3/1931 | Hirch | 30—289 |
| 1,813,868 | 7/1931 | Smiroldo | 30—293 X |
| 2,146,916 | 2/1939 | Richards | 30—289 |

ROBERT C. RIORDON, Primary Examiner

J. C. PETERS, Assistant Examiner

U.S. Cl. X.R.

30—179, 293